United States Patent [19]

Akao

[11] 4,386,124
[45] May 31, 1983

[54] WRAPPING MATERIALS

[75] Inventor: Mutsuo Akao, Minami-ashigara, Japan

[73] Assignee: Fuji Photo Film Co., Ltd., Kanagawa, Japan

[21] Appl. No.: 290,023

[22] Filed: Aug. 5, 1981

[30] Foreign Application Priority Data

Aug. 19, 1980 [JP] Japan .................................. 55-113594

[51] Int. Cl.³ ....................... B65D 81/24; B32B 27/30
[52] U.S. Cl. .................................... 428/35; 206/524.2; 229/3.5 MF; 229/53; 428/335; 428/336; 428/412; 428/463; 428/475.8; 428/483; 428/510; 428/520; 428/522; 428/910; 428/516
[58] Field of Search ............... 428/516, 910, 522, 520, 428/35, 335, 336, 412, 483, 475.8, 463, 510; 229/53, 3.5 MF; 206/524.2

[56] References Cited

U.S. PATENT DOCUMENTS

| 3,322,613 | 5/1967 | Rasmussen | 156/229 |
| 3,547,754 | 12/1970 | Tokos | 428/516 |
| 4,147,291 | 4/1979 | Akao | 428/516 |
| 4,258,848 | 3/1981 | Akao | 428/516 |
| 4,279,957 | 7/1981 | Hiraoka | 428/516 |

Primary Examiner—Ellis P. Robinson
Attorney, Agent, or Firm—Sughrue, Mion, Zinn, Macpeak & Seas

[57] ABSTRACT

A wrapping material is provided, which comprises two mono-axially stretched thermoplastic resin films, placed in such a manner that the stretching axes of the thermoplastic resin films cross each other at an angle of 45° to 90°, and an adhesive layer comprising an ethylene-ethyl acrylate copolymer resin sandwiched therebetween. This wrapping material has good physical strength and is suitable for use in the preparation of bags.

7 Claims, 4 Drawing Figures

WRAPPING MATERIALS

FIELD OF THE INVENTION

The present invention relates to wrapping materials and more particularly to antistatic wrapping materials having a high degree of physical strength.

BACKGROUND OF THE INVENTION

In general, wrapping materials must have various characteristics depending on factors such as the type, form and weight of the goods to be wrapped. It is particularly necessary for wrapping materials for making bags to have good physical strength, such as tear strength, tensile strength, burst strength, and impact strength. It is also desirable if wrapping materials used in making bags not to retain a static electrical charge.

U.S. Pat. Nos. 4,147,291 and 4,258,848 disclose wrapping materials having improved physical strength. The layer construction of these wrapping materials is shown in FIG. 1.

FIG. 1 shows a known wrapping material comprised of two mono-axially stretched, high density polyethylene films 1 and 2, placed in such a manner that the stretching axis of the film 1 forms an angle of 45° to 90° with that of the film 2. An adhesive layer 3 is sandwiched between films 1 and 2. This is a so-called cross-laminate film wrapping material. Although the adhesive layer 3 made of low density polyethylene is used in this wrapping material, it is unnecessary to always provide such an adhesive layer. The films 1 and 2 may be heat-sealed at an appropriate temperature of about 180° C.

The cross-laminate film wrapping material has a high degree of strength in the longitudinal, lateral, and oblique directions because the stretching axes of the films cross each other. Accordingly, the physical strength is markedly improved at least compared with a conventional composite laminate film wrapping material composed, for example, of a low density polyethylene film and paper, an aluminum foil, or the like.

The flexibility and physical strength of the cross-laminate film wrapping material will vary with the thickness of the adhesive layer 3. That is, it has been found that as the thickness of the adhesive layer 3 is increased, the physical strength is reduced and the flexibility is deteriorated.

If the mono-axially stretched thermoplastic resin film contains no antistatic agent or only a small amount of antistatic agent, it generates a large quantity of static electricity when leaving a pass roll, in the course of high-speed winding or high-speed bag making, thereby causing operational problems.

To overcome such operational problems, a method is used in which an aluminum foil is laminated, or a method is used in which the production speed is lowered and a large amount of carbon black is added to the thermoplastic resin film. The utilization of such a method makes it possible to obtain a light-shield preventing effect and an antistatic effect at the same time. However, such methods are economically unsatisfactory.

SUMMARY OF THE INVENTION

The object of the present invention is to provide a novel wrapping material free from the foregoing defects of conventional wrapping materials.

The present invention, therefore, provides a wrapping material comprising two mono-axially stretched thermoplastic resin films, laminated in such a manner that the stretching axes of the films form an angle of 45° to 90° with each other, with an adhesive layer comprising an ethylene-ethyl acrylate copolymer resin sandwiched therebetween.

DETAILED DESCRIPTION OF THE INVENTION

An ethylene-ethyl acrylate copolymer resin has heretofore been believed to be unsuitable for use as a wrapping material because it is expensive compared with a low density polyethylene resin and it has a particular odor.

When the ethylene-ethyl acrylate copolymer resin is used as an adhesive layer sandwiched between two mono-axially stretched thermoplastic resin films, it has been found that the amount of the copolymer resin being used can be reduced. Furthermore, odor problem with the copolymer resin is nearly eliminated because the resin is provided between two mono-axially stretched thermoplastic resin films. The laminate film formed has a high degree of physical strength, is flexible, generates less static electricity, and causes less curling. Thus, the laminate film is very desirable for use as a wrapping material.

The present invention is described below in greater detail with reference to the accompanying drawings.

Figure 2:
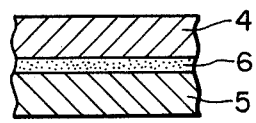
FIG. 2 is a cross-sectional view of a preferred embodiment of the wrapping material of the present invention.

FIG. 2 is a cross-sectional view of the most preferred embodiment of the wrapping material according to the present invention. This wrapping material is composed of two mono-axially stretched thermoplastic resin films 4 and 5, and an adhesive layer 6 comprising an ethylene-ethyl acrylate copolymer resin.

Any thermoplastic resins which can be mono-axially stretched can be used for the preparation of the mono-axially stretched thermoplastic resin films 4 and 5. The films 4 and 5 are preferably made of polyolefins such as polyethylenes, polypropylenes, polystyrenes, polyvinylidene chloride, polyvinyl chloride compounds, polycarbonates, polyethylene terephthalates, polyamides, and the like which may have various densities. The particularly preferred material is chosen based on availability, general-purpose properties, production suitability, and cost. Of these films, a mono-axially stretched high density polyethylene film having a density of 0.94 g/cm$^3$ or more is particularly preferred.

When producing mono-axially stretched thermoplastic resin films 4 and 5, the thermoplastic resin may be stretched in any of the longitudinal, lateral, and oblique directions. It is essential that the resin films 4 and 5 are laminated together in such a manner that the stretching directions of the resin films 4 and 5 cross each other at an angle of 45° to 90°.

It is also possible that oriented polymer films can be used as the mono-axially stretched thermoplastic resin films 4 and 5.

The adhesive layer 6 comprises an ethylene-ethyl acrylate copolymer resin in place of the conventional low density polyethylene. The adhesive layer 6 is preferably made up of an ethylene-ethyl acrylate copolymer resin. The adhesive layer 6 may be made of the blended products of the ethylene-ethyl acrylate copolymer resin and one or more resin(s) selected from polyethylene resins having various densities, polypropylene resins, polyvinyl acetate resins or polyvinyl acrylate resins, wherein the amount of ethylene-ethyl acrylate copolymer resin is at least 50 wt% based on the weight of blended products, as well as, made of the ethylene-ethyl acrylate copolymer resin.

Methods which can be used in providing the adhesive layer include extrusion coating. When a hot-melt type adhesive or the like is used it is possible to use coating methods such as gravure coating, metalling bar coating, air knife coating, roll nip coating.

In coating the ethylene-ethyl acrylate copolymer resin as the adhesive layer 6, it is desirable to maintain a lower temperature (by about 20° C.) than when using low density polyethylene, because the ethylene-ethyl acrylate copolymer resin is more easily decomposed by heat than the low density polyethylene.

As described above, the wrapping material of the present invention is prepared by laminating together two mono-axially stretched thermoplastic resin films with an adhesive layer comprising an ethylene-ethyl acrylate copolymer resin therebetween. The mono-axially stretched thermoplastic resin films are laminated such that their stretching axes form an angle of 45° to 90°. The wrapping material prepared in this manner is flexible, has less of a static electrical charge and has a high degree of physical strength compared with conventional laminate film in which a polyethylene adhesive layer is used. Thus, it is more preferred as a wrapping material.

The ethylene-ethyl acrylate copolymer resin of the present invention preferably has the ethylene/ethyl acrylate copolymerizing ratio of about 95/5 to about 65/35 by weight and more preferably of about 90/10 to about 80/20 by weight; preferably has the molecular weight of about 15,000 to about 45,000 and more preferably of about 25,000 to about 35,000; preferably has the Vicat softening point of about 40° C. to about 80° C. and more preferably of about 50° C. to about 70° C.; and preferably has the melt index of about 1 g/10 min to about 20 g/10 min and more preferably of about 5 g/10 min to about 15 g/10 min.

Specific examples of the ethylene-ethyl acrylate copolymer resin of the present invention include the following ethylene-ethyl acrylate copolymer resins but the present invention is not to be construed as being limited to these ethylene-ethyl acrylate copolymer resins.

| Type | Vicat Softening Poing (°C.) | Content of Ethyl Acrylate (wt %) | Melt Index (g/10 min) |
|---|---|---|---|
| DPDJ-6182 | 61 | 15 | 1.5 |
| DPDJ-6169 | 56 | 18 | 6 |
| DPDJ-6169 | 56 | 18 | 20 |
| DPDJ-6170 | 56 | 18 | 6 |
| DPDJ-6220 | 70 | 7 | 4 |
| DPDJ-8026 | 74 | 8 | 13 |

These ethylene-ethyl acrylate copolymer resins are all produced by Union Carbide Company in U.S.A. and Nippon Unicar Co., Ltd. in Japan.

The wrapping material of the present invention has an adhesion layer 6 with a thickness which is preferably from about 5μ to about 30μ and more preferably from about 7μ to about 15μ.

When the thickness of the adhesive layer is more than about 30μ, the two mono-axially stretched films 4 and 5 are completely united into a body and the effect of crossing the stretching axes thereof is decreased. On the other hand, when the thickness is less than about 5μ, film-cutting occurs and the two mono-axially stretched films 4 and 5 are separated apart due to a reduction in the adhesion strength therebetween.

The following example is given to illustrate the present invention in greater detail although the present invention is not limited thereto.

EXAMPLE

Figure 1:
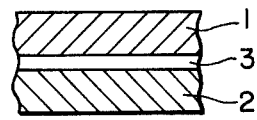
FIG. 1 is a cross-sectional view of a conventional wrapping material showing the layer construction.

A conventional wrapping material with the layer construction shown in FIG. 1 and a wrapping material of the present invention with the layer construction of FIG. 2 were prepared and were compared with respect to flexibility, retention of static electricity, abrasion resistance, and tear strength.

Two 45μ thick mono-axially stretched high density polyethylene films were placed in such a manner that the stretching axes thereof crossed at an angle of 90°. The films were then laminated together by extrusion-coating an adhesive layer made of low density polyethylene with a thickness of 13μ to thereby provide a conventional wrapping material having a total thickness of 103μ.

The above-described process was again carried out except that an ethylene-ethyl acrylate copolymer resin (EEA-6170, produced by Nippon Unicar Co., Ltd.) was used in place of the low density polyethylene to produce the wrapping material of the present invention having a total thickness of 103μ.

The wrapping materials prepared as described above were examined to determine the foregoing characteristics by the following testing methods. The results obtained are shown in the Table.

Tear Strength

Measured by JIS P-8116-1976.

Abrasion Resistance

The wrapping material was formed into a bag and an article having a weight of 5 kg was placed in the bag. The bag was then sealed, and subjected to a vibration test at JIS Level II. After the test, the surface of the wrapping material was examined to determine the extent of damage.

Flexibility

Measured by JIS P-8125-1976.

Amount of Electrostatic Charge

The amount of electrostatic charge formed when the wrapping material in a roll form was sent at a rate of 5 m/sec was measured using a sector type electrometer (for example, that manufactured and sold by Shishido Shokai in Japan under trade mark of Statiron).

TABLE

| | Conventional Wrapping Material | Wrapping Material of the Present Invention |
|---|---|---|
| Tear Strength (longitudinal) | (B) 720 g | (A) 1,027 g |

TABLE-continued

| | Conventional Wrapping Material | Wrapping Material of the Present Invention |
|---|---|---|
| (lateral) | (B) 828 g | (A) 1,436 g |
| Abrasion Resistance | (B) | (A) |
| Flexibility (longitudinal) | (C) 2.0 g | (B) 1.1 g |
| Amount of Electrostatic Charge | (C) | (B) |

The symbols (A), (B) and (C) have the following meanings:
(A) Especially excellent for practical use
(B) Excellent for practical use
(C) Just acceptable for practical use It can be seen from the Table that the wrapping material of the present invention is superior to the conventional wrapping material in all the characteristics tested.

The invention is not limited to the embodiment as described hereinbefore, and the following modifications can be made thereto.

Figure 3:
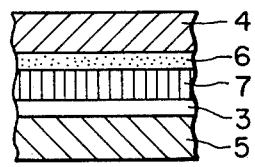
FIGS. 3 and 4 are each a cross-sectional view of other embodiments of the wrapping material of the present invention.

FIG. 3 is a cross-sectional view of a wrapping material comprising a mono-axially stretched thermoplastic resin film 5, and adhesive layer 3 made of a material heretofore ordinarily used, a flexible sheet 7 made of a plastic film, paper, aluminum or the like, an adhesive layer 6 comprising an ethylene-ethyl acrylate copolymer resin, and a mono-axially stretched thermoplastic resin layer 4. The wrapping material shown in FIG. 3 is prepared by laminating together the two mono-axially stretched thermoplastic resin films 4 and 5 with the flexible sheet 7 interposed therebetween by the use of the adhesion layer 6 comprising an ethylene-ethyl acrylate copolymer resin and the conventional adhesive layer 3.

Figure 4:
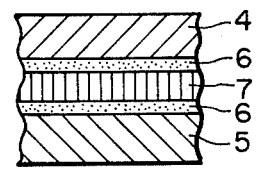

FIG. 4 is a cross-sectional view of a wrapping material comprising a mono-axially stretched thermoplastic resin film 5, an adhesive layer 6 comprising an ethylene-ethyl acrylate copolymer resin, a flexible sheet 7, an adhesive layer 6 comprising an ethylene-ethyl acrylate copolymer resin, and a mono-axially stretched thermoplastic resin layer 4. The flexible sheet 7 and mono-axially stretched thermoplastic resin films 4 and 5 are laminated together with the adhesive layer 6 comprising an ethylene-ethyl acrylate copolymer resin.

A light-shielding substance may be incorporated into any one of the mono-axially stretched films 4 and 5, the adhesive layers 3 and 6, and the flexible sheet 7. Furthermore, waxes may be incorporated into the adhesive layers 3 and 6.

When the wrapping material of the present invention is used for wrapping a light-sensitive article, it is particularly necessary to incorporate such light-shielding substances.

Light-shielding substances which can be used include carbon black, colored dyes, and inorganic pigments, such as $TiO_2$, clay, talc, and calcium carbonate, and metal powders, such as aluminum powder, aluminum paste, and tin powder.

The above-described modifications can be made to the wrapping material of the present invention depending on how the material will be used. The modified wrapping materials shown in FIGS. 3 and 4 have a high degree of physical strength compared with the wrapping material of FIG. 2 although the layer constructions thereof are somewhat complicated.

The wrapping material of the present invention, as can be seen from the foregoing description, provides desirable physical strength and when used for making a bag, possesses a number of other desirable characteristics.

The instant invention has been shown and described herein and was considered to be the most practical, and preferred embodiments. It is recognized, however, that departures may be made therefrom which are within the scope of the invention, and that obvious modifications will occur to one skilled in the art upon reading this specification. The description of particular embodiments is not intended to be limiting since the scope of the present invention will be limited only by the appended claims.

What is claimed is:

1. A wrapping material, comprising:
   first and second mono-axially stretched thermoplastic resin films on both surfaces thereof, said films laminated in such a manner that the stretching axes of the mono-axially stretched thermoplastic resin films cross each other at an angle of 45° to 90°; and
   an adhesive layer consisting essentially of an ethylene-ethyl acrylate copolymer resin or an ethylene-ethyl acrylate copolymer resin and light-shielding substances, which ethylene-ethyl acrylate copolymer resin has an ethylene/ethyl acrylate copolymerizing ratio of about 95/5 to about 65/35 by weight, a molecular weight of about 15,000 to about 45,000, a Vicant softening point of about 40° C. to about 80° C. and a melt index of about 1 g/10 min to about 20 g/10 min, sandwiched between said first and second films.

2. The wrapping material as claimed in claim 1, wherein the mono-axially stretched thermoplastic resin films are a polyolefin resin films.

3. The wrapping material as claimed in claim 2, wherein the polyolefin resin films are a high density polyethylene film having a density of 0.94 $g/cm^3$ or more.

4. The wrapping material as claimed in claim 1, wherein the thickness of the adhesive layer comprising an ethylene-ethyl acrylate copolymer resin is from about 5μ to about 30μ.

5. The wrapping material as claimed in any of claim 1, 2, 3, or 4, wherein the thickness of the adhesive layer comprising an ethylene-ethyl acrylate copolymer resin is from about 7μ to about 15μ.

6. A wrapping material having an improved antistatic property for wrapping a light-sensitive article, said wrapping material comprising:
   first and second mono-axially stretched thermoplastic resin films on both surfaces thereof, said films laminated in such a manner that the stretching axes of the mono-axially stretched theremoplstic resin films cross each other at an angle of 45° to 90°; and
   an adhesive layer consisting essentially of an ethylene-ethyl acrylate copolymer resin or an ethylene-ethyl acrylate copolymer resin and light-shielding substances, which ethylene-ethyl acrylate copolymer resin has an ethylene/ethyl acrylate copolymerizing ratio of about 95/5 to about 65/35 by weight, a molecular weight of about 15,000 to about 45,000, a Vicant softening point of about 40° C. to about 80° C. and a melt index of about 1 g/10 min to about 20 g/10 min, sandwiched between said first and second films.

7. A bag for wrapping light-sensitive material made of a wrapping material having an improved anti-static property, said wrapping material comprising:

first and second mono-axially stretched theremoplastic resin films on both surfaces thereof, said films laminated in such a manner that the stretching axes of the mono-axially stretched thermoplastic resin films cross each other at an angle of 45° to 90°; and an adhesive layer consisting essentially of an ethylene-ethyl acrylate copolymer resin or an ethylene-ethyl acrylate copolymer resin and light-shielding substances, which ethylene-ethyl acrylate copolymer resin has an ethylene/ethyl acrylate copolymerizing ratio of about 95/5 to about 65/35 by weight, a molecular weight of about 15,000 to about 45,000, a Vicant softening point of about 40° C. to about 80° C. and a melt index of about 1 g/10 min to about 20 g/10 min, sandwiched between said first and second films.

* * * * *